(12) United States Patent
Darmawikarta et al.

(10) Patent No.: US 12,504,581 B2
(45) Date of Patent: Dec. 23, 2025

(54) PHOTONIC INTERCONNECT AND COMPONENTS IN GLASS

(71) Applicant: Intel Corporation, Santa Clara, CA (US)

(72) Inventors: Kristof Darmawikarta, Chandler, AZ (US); Benjamin Duong, Chandler, AZ (US); Srinivas V. Pietambaram, Chandler, AZ (US); Tarek A. Ibrahim, Mesa, AZ (US); Hari Mahalingam, San Jose, CA (US); Bai Nie, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 17/476,357

(22) Filed: Sep. 15, 2021

(65) Prior Publication Data

US 2023/0083222 A1    Mar. 16, 2023

(51) Int. Cl.
  *G02B 6/12*     (2006.01)
  *G02B 6/122*    (2006.01)
  *G02B 6/13*     (2006.01)

(52) U.S. Cl.
  CPC ............... *G02B 6/122* (2013.01); *G02B 6/13* (2013.01); *G02B 2006/12038* (2013.01)

(58) Field of Classification Search
  CPC .. G02B 6/12; G02B 6/12002; G02B 6/12004; G02B 6/122; G02B 6/1223
  See application file for complete search history.

(56) References Cited

U.S. PATENT DOCUMENTS

| | | | |
|---|---|---|---|
| 5,838,853 A * | 11/1998 | Jinnai | G02B 6/125 385/48 |
| 6,549,713 B1 | 4/2003 | Pi | |
| 2004/0001684 A1* | 1/2004 | Korenaga | G02B 6/138 385/132 |
| 2004/0165854 A1* | 8/2004 | Niiyama | G02B 6/3652 385/137 |
| 2011/0135248 A1* | 6/2011 | Langer | H05K 1/0274 29/829 |

(Continued)

FOREIGN PATENT DOCUMENTS

| | | |
|---|---|---|
| DE | 202008009454 U1 * | 10/2008 |
| KR | 2004 0036212 A | 4/2004 |
| WO | WO 2012/047024 | 4/2012 |

OTHER PUBLICATIONS

Search Report from European Patent Application No. 22189557.6, mailed Feb. 1, 2023, 9 pgs.

(Continued)

*Primary Examiner* — Michael Stahl
(74) *Attorney, Agent, or Firm* — Schwabe, Williamson & Wyatt, P.C.

(57) ABSTRACT

Embodiments disclosed herein include electronic packages with photonics integrated circuits (PICs). In an embodiment, an electronic package comprises a glass substrate with a first recess and a second recess. In an embodiment, a PIC is in the first recess. In an embodiment, an optics module is in the second recess, and an optical waveguide is embedded in the glass substrate between the first recess and the second recess. In an embodiment, the optical waveguide optically couples the PIC to the optics module.

21 Claims, 15 Drawing Sheets

(56) References Cited

U.S. PATENT DOCUMENTS

| | | | |
|---|---|---|---|
| 2013/0286676 A1* | 10/2013 | Kim | G02B 6/0008 |
| | | | 29/832 |
| 2019/0041498 A1* | 2/2019 | Droz | G01S 7/4818 |
| 2021/0120680 A1* | 4/2021 | Pun | H05K 1/141 |
| 2022/0075110 A1* | 3/2022 | Fliszar | G02B 5/1809 |
| 2022/0171116 A1* | 6/2022 | Pohlen | G02B 6/0043 |
| 2022/0214501 A1* | 7/2022 | Kuo | G02B 6/305 |

OTHER PUBLICATIONS

Kagami Met Al: "Simultaneous Fabrication of Optical Channel Waveguides and 12 Out-Of-Plane Branching Mirrors From a Polymeric Slab Structure", Applied Optics, Optical Society of America, Washington, DC, US, vol. 36, No. 30, Oct. 20, 1997 (Oct. 20, 1997), pp. 7700-7707, XP000724206, ISSN: 0003-6935, DOI: 10.1364/A0.36.007700.

Notice of Allowance from European Patent Application No. 22189557.6, mailed Jun. 25, 2024, 38 pgs.

Notice of Allowance from European Patent Application No. 22189557.6, mailed Dec. 19, 2024, 39 pgs.

Office Action from European Patent Application No. 22189557.6, mailed Oct. 4, 2024, 4 pgs.

* cited by examiner

PHOTONIC INTERCONNECT AND COMPONENTS IN GLASS

TECHNICAL FIELD

Embodiments of the present disclosure relate to electronic packages, and more particularly to glass substrates with embedded waveguides for photonics connections.

BACKGROUND

Next generation server high speed communication protocols are expected to rely heavily on optical interconnect architectures. As such, high-density interconnect substrate packages need to accommodate multiple photonic devices. Currently, bridge architectures (e.g., embedded multi-die interconnect bridge (EMIB) architectures) are used to support multi-chip packaging with photonic devices connected to the silicon logic die through the bridge die. In this configuration, fiber bundles are attached to the photonic IC from the side (e.g., with a V-groove connection or a multi-lens array).

Assembly of these fiber bundles is non-trivial due to the stringent alignment requirement which is exacerbated by the undulation and warpage of standard organic substrate packages. One proposal is to use glass cored substrates to provide a flatter, more rigid starting material. However, the addition of organic layers and plating steps can increase the final undulation and warpage that the photonic components see.

EMBODIMENTS OF THE PRESENT DISCLOSURE

Described herein are electronic packages with glass substrates with embedded waveguides for photonics connections, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, optical interconnect architectures are needed for high speed communication protocols for next generation server products. Existing architectures for enabling optical interconnects are limited. Particularly, the warpage and deformation present in organic packaging architectures makes the alignment and attachment of optical interconnects in the package difficult and low yielding.

Accordingly, embodiments disclosed herein include package substrates that are glass. The glass substrates may improve planarity and reduce warpage. In some embodiments, the optical interconnects are made before any organic layers are provided over the glass substrate. In some embodiments, optical components (e.g., photonics integrated circuits (PICs), optics modules (e.g., lenses, etc.) may be placed in recesses into the glass substrate. Optical connections between the optical components may be made by embedded optical waveguides. In some embodiments, the optical waveguides are formed with a direct write process. In a direct write process a laser is scanned over portions of the glass substrate where an optical waveguide is needed. The laser can produce a change in the microstructure of the glass that provides an increase in the refractive index. In other embodiments, the optical waveguides are formed with a lithographic patterning process. A second glass substrate may then be adhered to the underlying glass substrate so that the optical waveguides are between the pair of glass substrates.

Figure 1A:
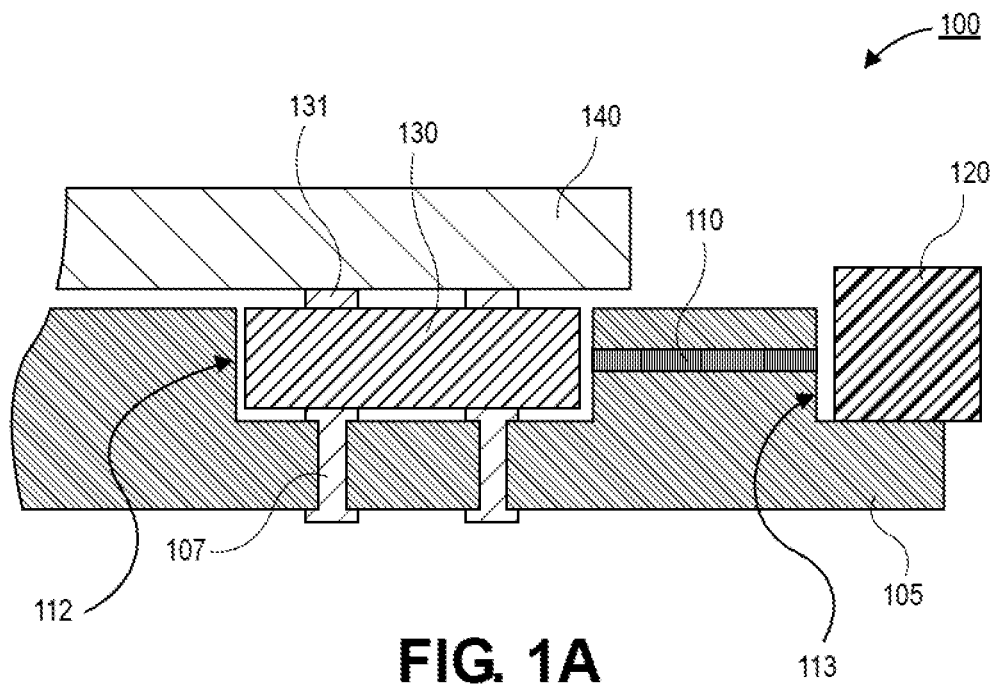
FIG. 1A is a cross-sectional illustration of an electronic package with a glass substrate with an embedded optical waveguide between an optics module and a photonics integrated circuit (PIC), in accordance with an embodiment.

Referring now to FIG. 1A, a cross-sectional illustration of an electronic package 100 is shown, in accordance with an embodiment. In an embodiment, the electronic package 100 comprises a glass substrate 105. The glass substrate 105 may have any glass formulation. The use of a glass substrate 105 improves the rigidity and planarity of the electronic package 100. As such, it is easier to integrate optical components with proper alignment. The glass substrate 105 may have a thickness between approximately 100 µm and approximately 5,000 µm. Though, it is to be appreciated that thinner or thicker glass substrates 105 may also be used.

In an embodiment, recesses may be formed into the top surface of the glass substrate 105. In FIG. 1A, a first recess 112 and a second recess 113 are provided into the glass substrate 105. In the illustrated embodiment, the depths of the first recess 112 and the second recess 113 are substantially equal. However, in other embodiments, the first recess 112 and the second recess 113 may have different depths. In an embodiment, the first recess 112 is towards a middle of the glass substrate 105, and the second recess 113 is at an edge of the glass substrate 105. In an embodiment, through glass vias 107 may be provided below the first recess 113. Through glass vias (not shown) may also be provided from the top surface of the glass substrate 105 to the bottom surface of the glass substrate 105.

In an embodiment, photonics components may be placed into the first recess 112 and the second recess 113. For example, an optics module 120 may be placed in the second recess 113. The optics module 120 may include optics features to couple the electronic package to external optical fibers (not shown). For example, the optics module 120 may comprise lenses, optical fibers, mechanical features for aligning fibers, and the like. In an embodiment, a PIC 130 may be placed in the first recess 112. The PIC 130 has circuitry and functionality to convert signals between an optical regime and an electrical regime. The electrical side of the PIC 130 may be connected to a die 140 by interconnects 131. The die 140 may be a logic die, an FPGA, an SoC, or the like. The die 140 may be provided over a top surface of the glass substrate 105.

In an embodiment, the optics module 120 is optically coupled to the PIC 130 by an embedded optical waveguide 110. The optical waveguide 110 may be entirely embedded in the glass substrate 105. That is, the glass substrate 105 surrounds and entire perimeter of the optical waveguide 110. The optical waveguide 110 may be substantially the same material as the glass substrate 105. However, the optical waveguide 110 has been treated in order to change the refractive index to be higher than the surrounding glass substrate 105. For example, a laser treatment of portions of the glass substrate 105 may result in the microstructure of the optical waveguide 110 being different than a microstructure of the glass substrate 105. In some embodiments, the optical waveguide 110 may have a substantially crystalline microstructure or partially crystalline microstructure, and the glass substrate 105 may have a substantially amorphous microstructure. In an embodiment, the optical waveguide 110 may extend from a sidewall of the first recess 112 to a sidewall of the second recess 113.

Additionally, while a single optical waveguide 110 is shown, it is to be appreciated that a plurality of optical waveguides 110 may optically couple the optics module 120 to the PIC 130. In some embodiments, each of the plurality of optical waveguides 110 are at the same z-height in the glass substrate 105. In other embodiments, the optical waveguides 110 may be a different z-heights in the glass substrate 105.

Figure 1B:
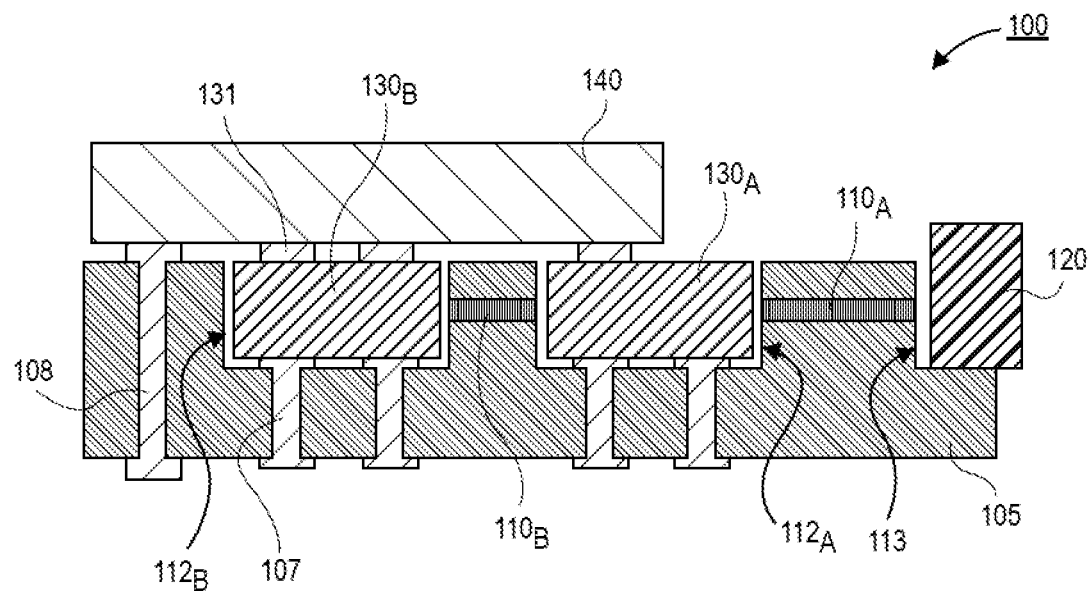
FIG. 1B is a cross-sectional illustration of an electronic package with a glass substrate with embedded optical waveguides between PICs and between an optics module and one of the PICs, in accordance with an embodiment.

Referring now to FIG. 1B, a cross-sectional illustration of an electronic package 100 is shown, in accordance with an additional embodiment. In an embodiment, the electronic package 100 in FIG. 1B may be substantially similar to the electronic package 100 in FIG. 1A, with the exception of there being a pair of first recesses 112A and 112B, and a pair of PICs 130A and 130B. The first PIC 130A may be placed in the first recess 112A and the second PIC 130E may be placed in the first recess 112B. Additionally, a through glass via 108 from the top surface of the glass substrate 105 to a bottom surface of the glass substrate 105 is shown.

In an embodiment, the first PIC 130A may be optically coupled to the second PIC 130E by a second optical waveguide 110B. In an embodiment, the second optical waveguide 110E may be at the same z-height within the glass substrate 105 as the first optical waveguide 110A between the first PIC 130A and the optics module 120. In other embodiments, the second optical waveguide 110E and the first optical waveguide 110A may be different z-heights. The second optical waveguide 110E may be substantially similar to the first optical waveguide 110A. For example, the second optical waveguide 110E may have a crystalline or partially crystalline microstructure that provides a higher refractive index than the surrounding glass substrate 105.

Referring now to FIG. 2A-2E, a series of cross-sectional illustrations depicting a process for forming an electronic package with a glass substrate with embedded optical waveguides is shown, in accordance with an embodiment.

Figure 2A:
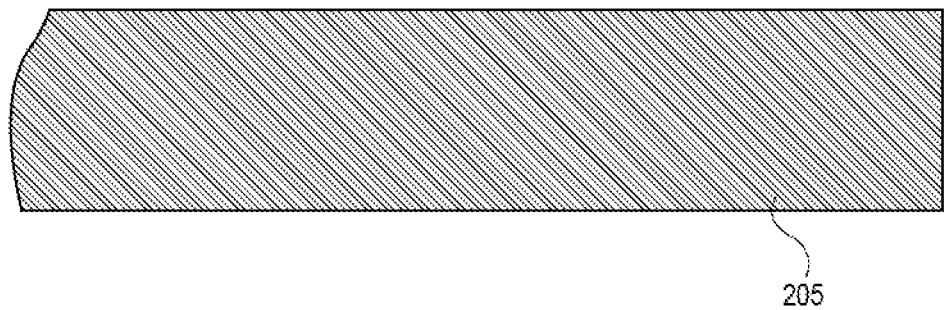
FIGS. 2A-2E are cross-sectional illustrations depicting a process to form an electronic package with a glass substrate and an embedded optical waveguide, in accordance with an embodiment.

Referring now to FIG. 2A, a cross-sectional illustration of the glass substrate 205 is shown, in accordance with an embodiment. In an embodiment, the glass substrate 205 may have any suitable glass formulation. The glass substrate 205 may have a thickness between approximately 100 µm and approximately 5,000 µm.

Figure 2B:
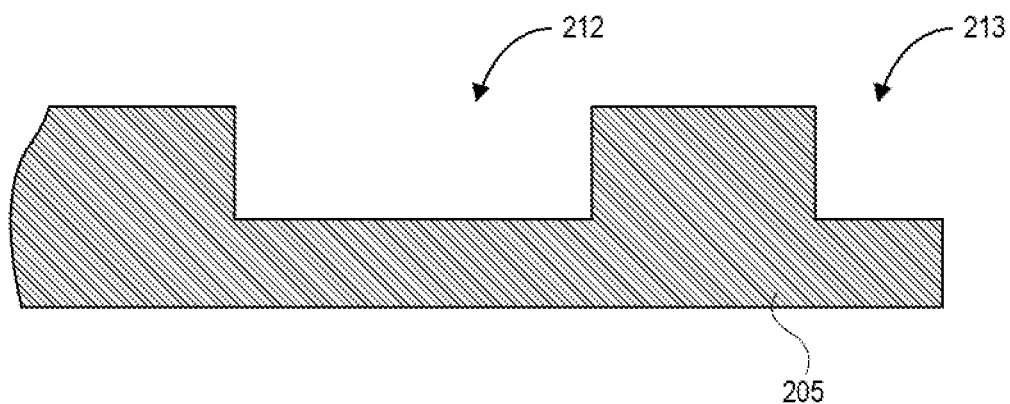

Referring now to FIG. 2B, a cross-sectional illustration of the glass substrate 205 after a first recess 212 and a second recess 213 are formed into the glass substrate 205 is shown, in accordance with an embodiment. In an embodiment, the first recess 212 and the second recess 213 may be formed with any suitable material removal process, such as an etching process. In a particular embodiment, a laser assisted etching process may be used to form the first recess 212 and the second recess 213.

In an embodiment, the first recess 212 is entirely within a perimeter of the glass substrate 205. As such, the first recess 212 may have four sidewalls. The second recess 213 may be at an edge of the glass substrate 205. As such, the second recess 213 may have fewer than four sidewalls (e.g., three sidewalls). In the illustrated embodiment, the first recess 212 and the second recess 213 are shown as having the same depth into the glass substrate 205. However, in other embodiments, the depths of the first recess 212 and the second recess 213 may be non-uniform. In the illustrated embodiment, the sidewalls of the first recess 212 and the second recess 213 are substantially vertical. In other embodiments, the sidewalls may be sloped so that the recesses have a taper.

Figure 2C:
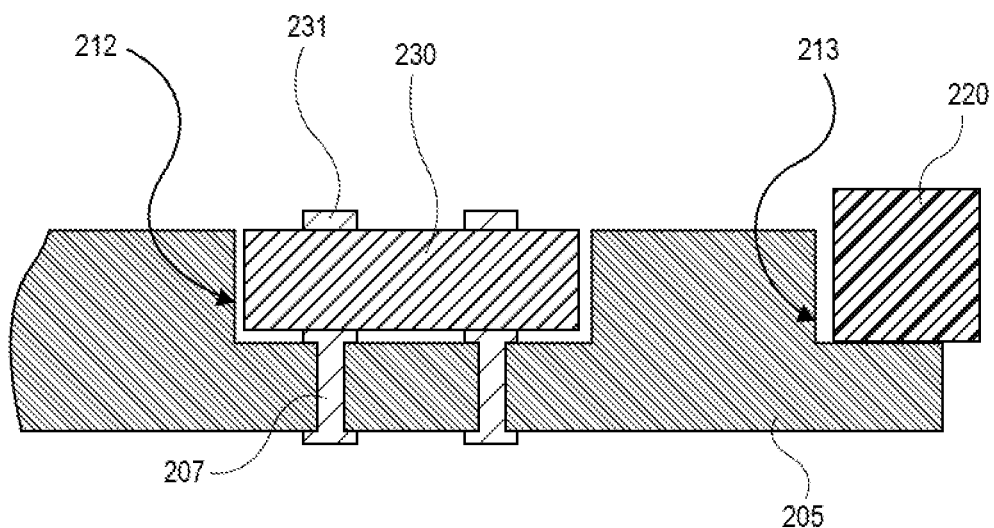

Referring now to FIG. 2C, a cross-sectional illustration of the glass substrate after the placement of the optics module 220 and the PIC 230 in the recesses 213 and 212 is shown, in accordance with an embodiment. In an embodiment, the PIC 230 and the optics module 220 may be placed with a pick-and-place operation. In some embodiments, through glass vias 207 may be formed through the glass substrate 205 below the first recess 212. The PIC 230 may be bonded to the through glass vias 207. For example, a solder (not shown) may bond the PIC 230 to the through glass vias 207. However, it is to be appreciated that the through glass vias 207 may be omitted in some embodiments. In such embodiments, the PIC 230 may be secured to the glass substrate 205 by an adhesive or the like. Pads 231 may be provide over a top surface of the PIC 230. The pads 231 may be suitable for attaching to a die in a subsequent processing operation. In an embodiment, the optics module 220 may be secured to the glass substrate 205 by an adhesive (not shown) or the like.

Figure 2D:
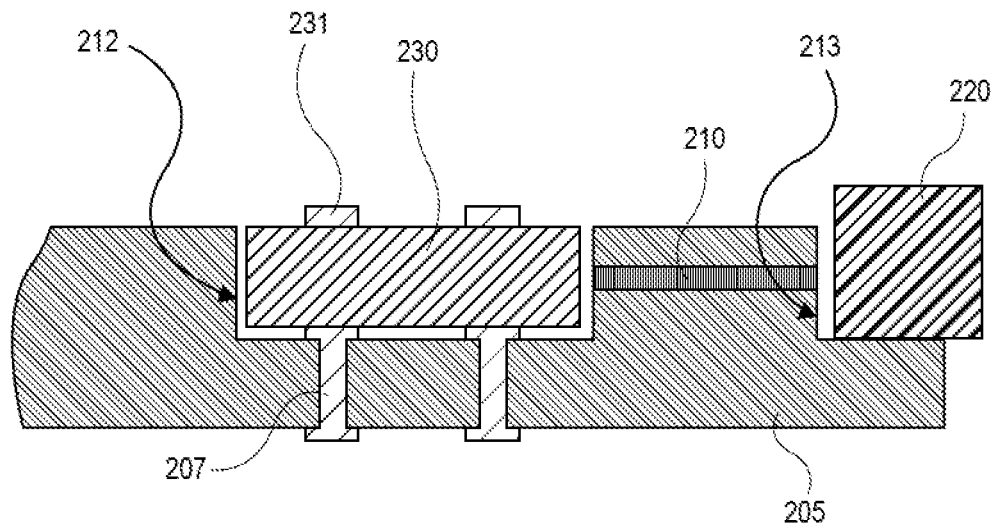

Referring now to FIG. 2D, a cross-sectional illustration of the glass substrate 205 after formation of an optical waveguide 210 is shown, in accordance with an embodiment. In an embodiment, the optical waveguide 210 is formed with a direct write operation. For example, a laser is scanned across the glass substrate 205 in order to change the structure of the glass at a desired depth within the glass substrate 205. For example, the optical waveguide 210 may have a crystalline or partially crystalline microstructure while the surrounding glass substrate 205 has a substantially amorphous microstructure. The change in the microstructure may result in a change in the refractive index of the optical waveguide 210. Particularly, the refractive index of the optical waveguide 210 may be higher than the refractive index of the glass substrate 205.

The use of a direct write process to form the optical waveguides 210 is particularly beneficial. This is because the direct write process can account for any misalignment between the PIC 230 and the optics module 220. That is, if one or both of the PIC 230 and the optics module 220 are misaligned, the laser scan pattern can be easily modified to accommodate the misalignment.

Figure 2E:
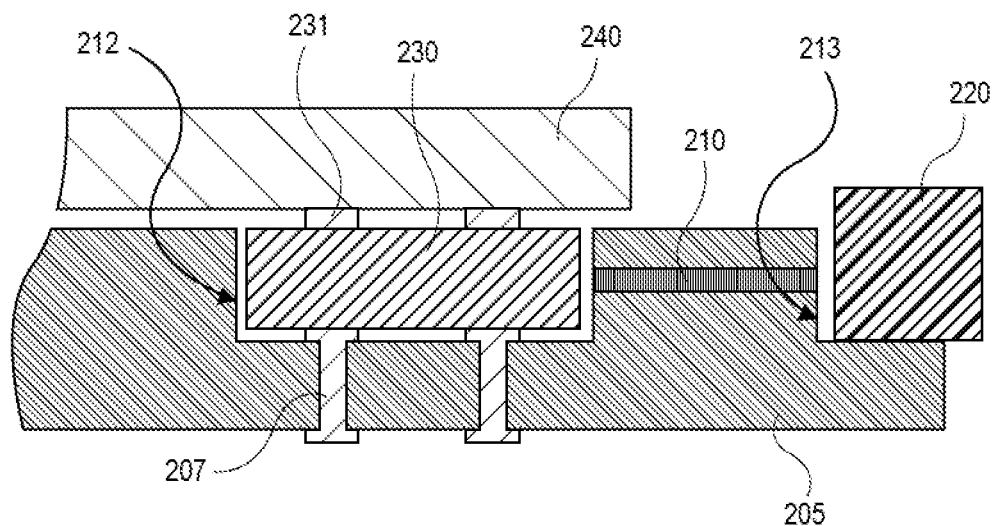

Referring now to FIG. 2E, a cross-sectional illustration of the glass substrate 205 after a die 240 is attached to the PIC 230 is shown, in accordance with an embodiment. In an embodiment, the die 240 may be any suitable die, such as a logic die, an FPGA, an SoC, or the like.

Figure 3A:
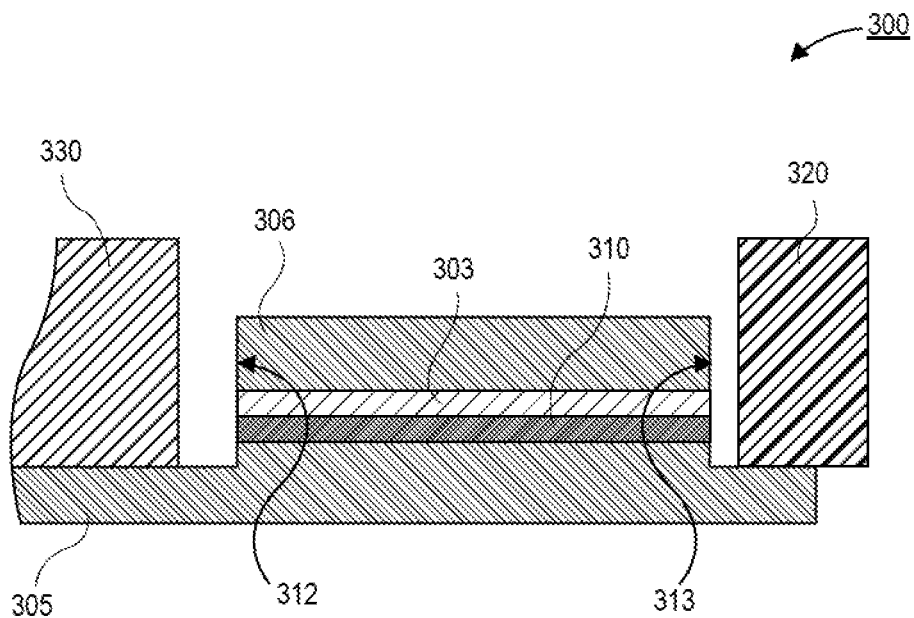
FIG. 3A is a cross-sectional illustration of an electronic package with a first glass substrate, a second glass substrate, and an optical waveguide positioned between the first glass substrate and the second glass substrate, in accordance with an embodiment.
Figure 3B:
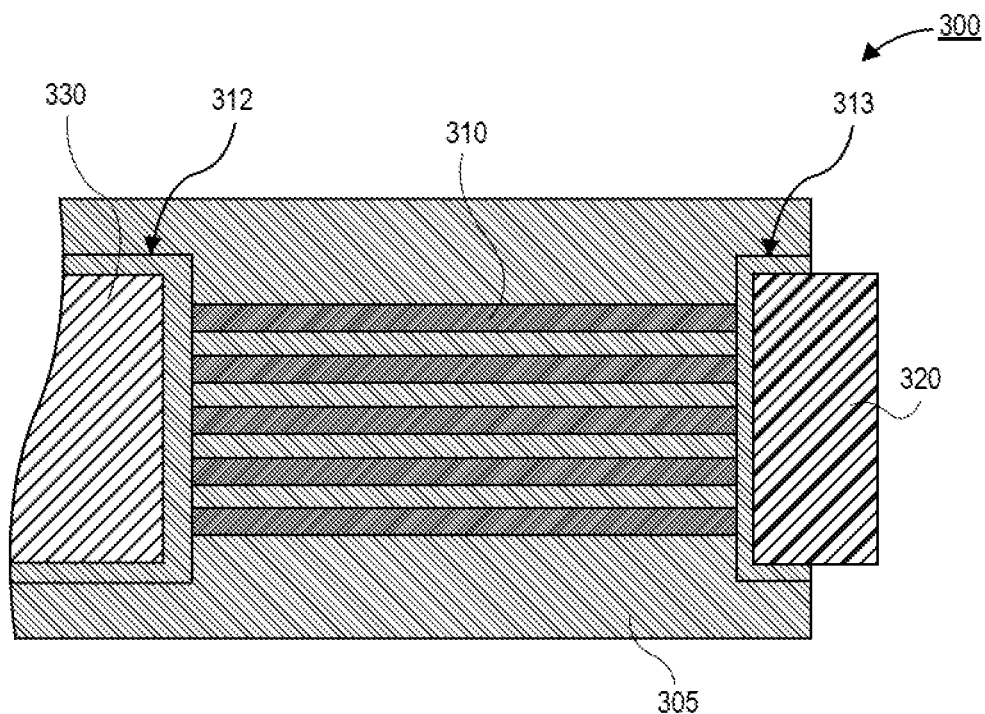
FIG. 3B is a plan view illustration of an electronic package with a plurality of optical waveguides between a PIC and an optics module, in accordance with an embodiment.

Referring now to FIGS. 3A and 3B, illustrations of an electronic package 300 are shown, in accordance with an additional embodiment. Instead of an optical waveguide that is embedded in a glass substrate, the optical waveguides are provided between a pair of glass substrates.

Referring now to FIG. 3A, a cross-sectional illustration of an electronic package 300 is shown, in accordance with an embodiment. In an embodiment, the electronic package 300 comprises a first glass substrate 305. An optical waveguide 310 may be provided over the first glass substrate 305. The optical waveguide 310 may be a material that has a higher refractive index than the first glass substrate 305. For example, the optical waveguide 310 may comprise silicon and nitrogen (e.g., $SiN_x$). An adhesive 303 may be provided over the optical waveguide 310. A second glass substrate 306 may be attached to the structure by the adhesive 303. In an embodiment, a first recess 312 and a second recess 313 are provided into the stack. The first recess 312 and the second recess 313 may extend entirely through the second glass substrate 306. In some embodiments the first recess 312 and the second recess 313 may also extend into the first glass substrate 305. In an embodiment, a PIC 330 may be provided in the first recess 312 and an optics module 320 may be provided in the second recess 313. The PIC 330 may be optically coupled to the optics module 320 by the optical waveguide 310.

Referring now to FIG. 3B, a plan view illustration of the electronic package 300 is shown, in accordance with an embodiment. In FIG. 3B the second glass substrate 306 and the adhesive 303 are omitted for clarity. As shown, a plurality of optical waveguides 310 may be provided between the first recess 312 and the second recess 313. For example five optical waveguides 310 are shown. However, it is to be appreciated that any number of optical waveguides 310 may be used.

Referring now to FIGS. 4A-4I, a series of cross-sectional illustrations depicting a process for forming an electronic package with embedded optical waveguides is shown, in accordance with an embodiment.

Figure 4A:
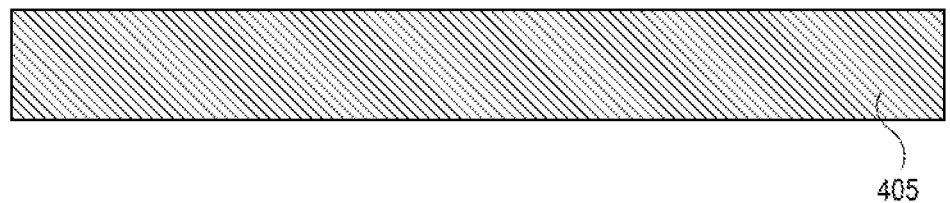
FIGS. 4A-4I are cross-sectional illustrations depicting a process for forming an electronic package with optical waveguides embedded in a glass substrate, in accordance with an embodiment.

Referring now to FIG. 4A, a cross-sectional illustration of a glass layer 405 is shown, in accordance with an embodiment. The glass layer 405 may have any suitable glass formulation. Additionally, the glass layer 405 may have a thickness between approximately 100 µm and approximately 5,000 µm.

Figure 4B:
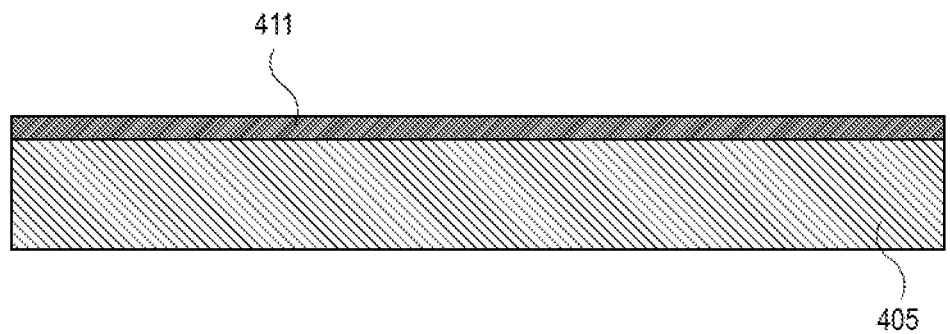

Referring now to FIG. 4B, a cross-sectional illustration of the glass layer 405 after a waveguide layer 411 is deposited over the glass layer 405 is shown, in accordance with an embodiment. In an embodiment, the waveguide layer 411 may be a material that has a higher index of refraction than the glass layer 405. For example, the waveguide layer 411 may comprise silicon and nitrogen (e.g., $SiN_x$). The waveguide layer 411 may be deposited with any suitable deposition process, (e.g., sputtering, chemical vapor deposition (CVD), physical vapor deposition (PVD), or the like).

Figure 4C:
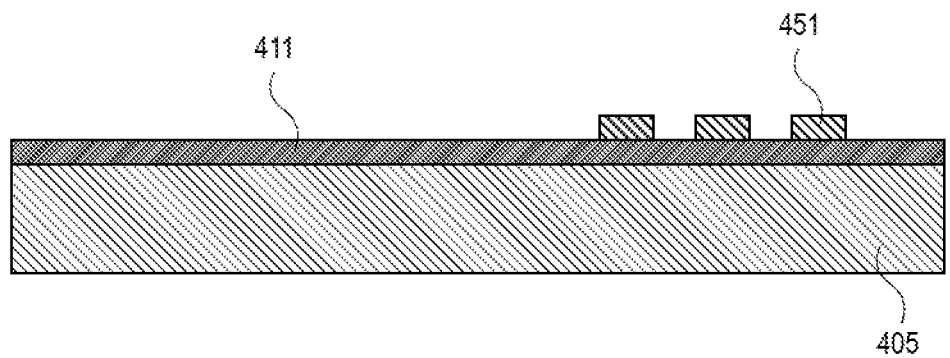

Referring now to FIG. 4C, a cross-sectional illustration of the glass layer 405 after a mask 451 is disposed over the waveguide layer 411 is shown, in accordance with an embodiment. In an embodiment, the mask 451 may have a pattern of the desired optical waveguides that are to be formed from the waveguide layer 411. In an embodiment, the mask may be a hard mask or a soft mask. For example, a hard mask may include a copper mask, and a soft mask may include a resist or the like.

Figure 4D:
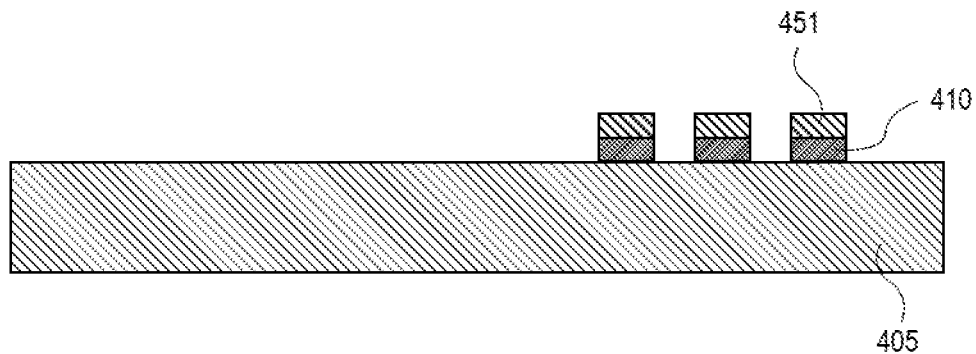

Referring now to FIG. 4D, a cross-sectional illustration of the glass layer 405 after the waveguide layer 411 is patterned is shown, in accordance with an embodiment. As shown, the mask 451 protects portions of the waveguide layer 411 during an etching process to form optical waveguides 410. In an embodiment, the etching process may be a plasma etching process.

Figure 4E:
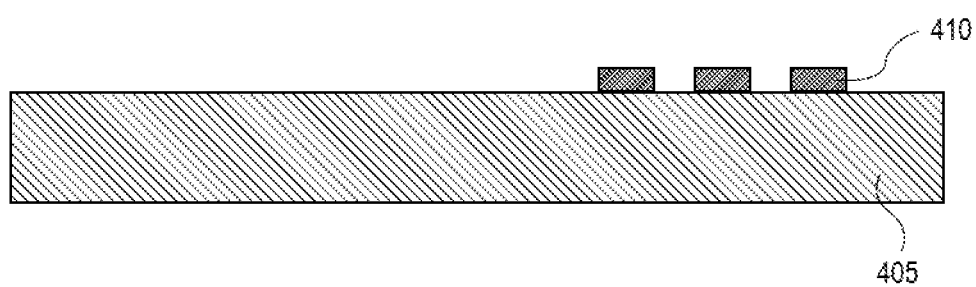

Referring now to FIG. 4E, a cross-sectional illustration of the glass layer 405 after the mask 451 is removed is shown, in accordance with an embodiment. The mask 451 may be removed with an ashing process or other process selective to the mask 451 over the optical waveguides 410.

Figure 4F:
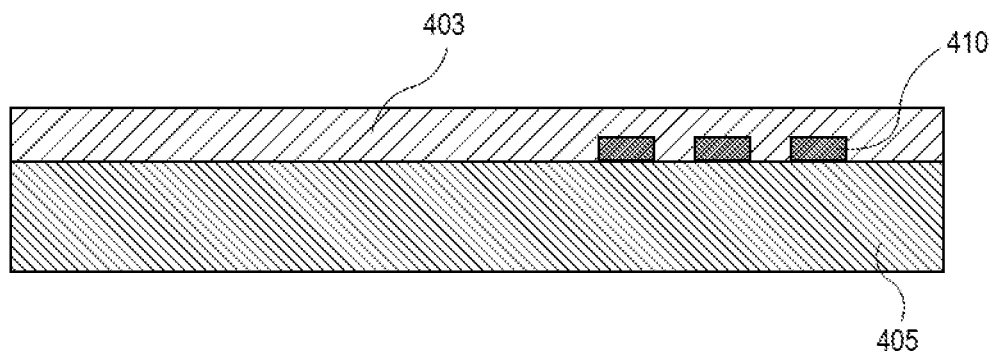

Referring now to FIG. 4F, a cross-sectional illustration of the glass layer 405 after a capping layer 403 is disposed over the glass layer 405 and the optical waveguides 410 is shown, in accordance with an embodiment. In an embodiment, the capping layer 403 may have an index of refraction that is lower than the index of refraction of the optical waveguides 410. In some embodiments, the capping layer 403 may be an adhesive. When the capping layer 403 is an adhesive, a second glass layer (not shown) may be attached over the capping layer 403. When a second glass layer is attached, the process of forming the optical waveguides may be complete. However, in other embodiments, additional layers may be provided over the capping layer 403 in order to provide optical waveguides at multiple Z-heights, as shown in FIGS. 4G-4I.

Figure 4G:
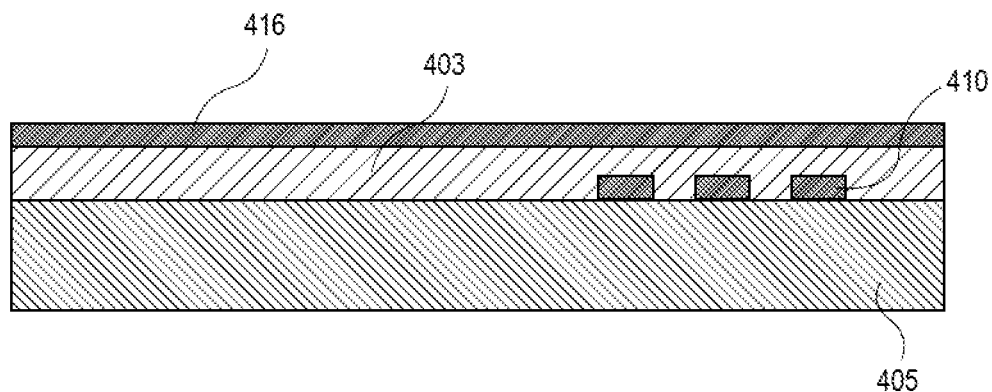

Referring now to FIG. 4G, a cross-sectional illustration of the glass layer 405 after a second waveguide layer 416 is deposited over the capping layer 403 is shown, in accordance with an embodiment. The second waveguide layer 416 may be the same material as the optical waveguides 410. For example, the second waveguide layer 416 may comprise silicon and nitrogen. The second waveguide layer 416 may be deposited with any suitable deposition process, such as sputtering.

Figure 4H:
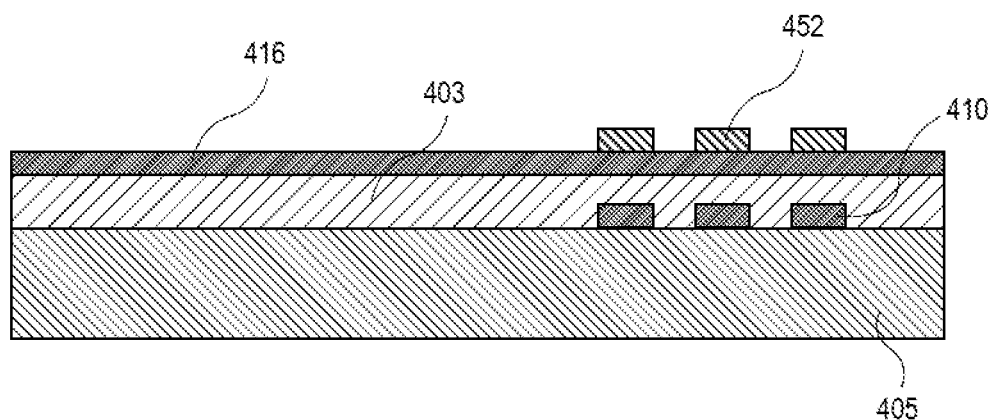

Referring now to FIG. 4H, a cross-sectional illustration of the glass layer 405 after a second mask 452 is formed over the second waveguide layer 416 is shown, in accordance with an embodiment. The second mask 452 may be a hardmask material or a soft mask material. The second mask 452 may be substantially similar to the mask 451 described in greater detail above.

Figure 4I:
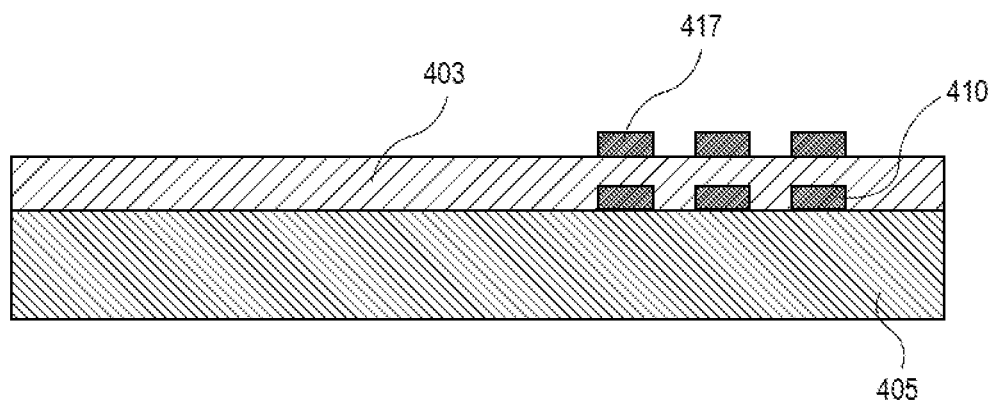

Referring now to FIG. 4I, a cross-sectional illustration of the glass layer 405 after the second waveguide layer 416 is patterned to form second optical waveguides 417 is shown, in accordance with an embodiment. As shown, the second optical waveguides 417 may be directly over the optical waveguides 410. Accordingly, it is to be appreciated that optical waveguides 410 and 417 may be provided at multiple Z-heights within a package substrate.

After formation of the second optical waveguides 417, an additional capping layer (not shown) may be provided over the second optical waveguides 417. A second glass layer (not shown) may then be provided over the second capping layer. In other embodiments, additional layers of optical waveguides may be provided by repeating the process any number of times.

Referring now to FIGS. 5A-5E, a series of illustrations depicting a process for forming an electronic package is shown, in accordance with an embodiment.

Figure 5A:
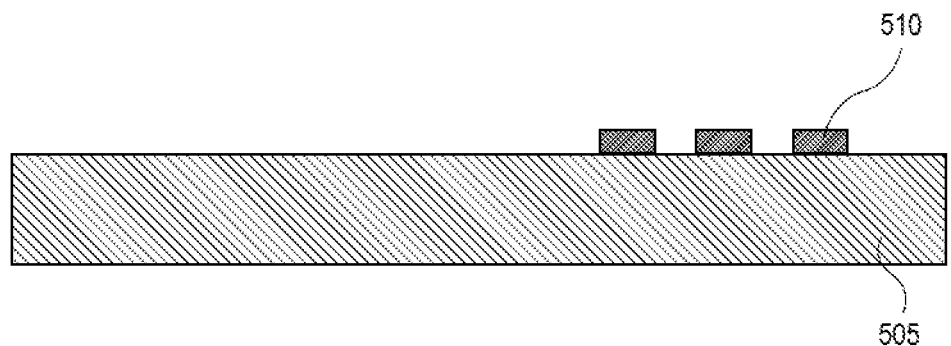
FIGS. 5A-5E are cross-sectional illustrations depicting a process for forming an electronic package with optical waveguides embedded in a glass substrate, in accordance with an embodiment.

Referring now to FIG. 5A, a cross-sectional illustration of a glass layer 505 with optical waveguides 510 on a surface of the glass layer 505 is shown, in accordance with an embodiment. In an embodiment, the optical waveguides 510 may be formed with a process similar to the process described above with respect to FIGS. 4A-4E, and will not be repeated here.

Figure 5B:
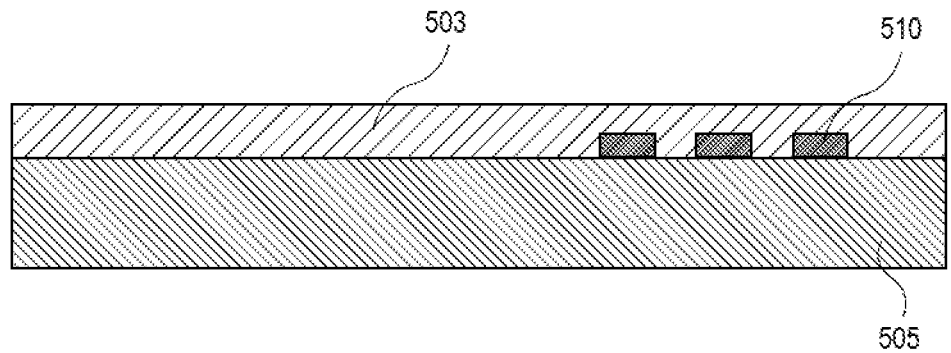

Referring now to FIG. 5B, a cross-sectional illustration of the glass layer 505 after an adhesive 503 is provided over the optical waveguides 510 and the glass layer 505 is shown, in accordance with an embodiment. In an embodiment, the adhesive 503 has an index of refraction that is lower than the index of refraction of the optical waveguides 510.

Figure 5C:
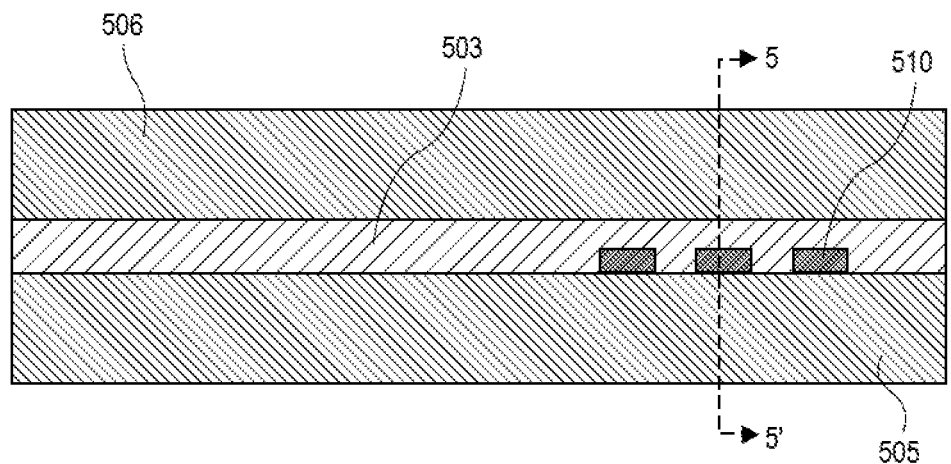

Referring now to FIG. 5C, a cross-sectional illustration of the glass layer 505 after a second glass layer 506 is disposed over the adhesive 503 is shown, in accordance with an embodiment. In an embodiment, the second glass layer 506 may have a thickness that is substantially equal to a thickness of the glass layer 505. In other embodiment, the second glass layer 506 may have a thickness that is different than that of the glass layer 505.

Figure 5D:
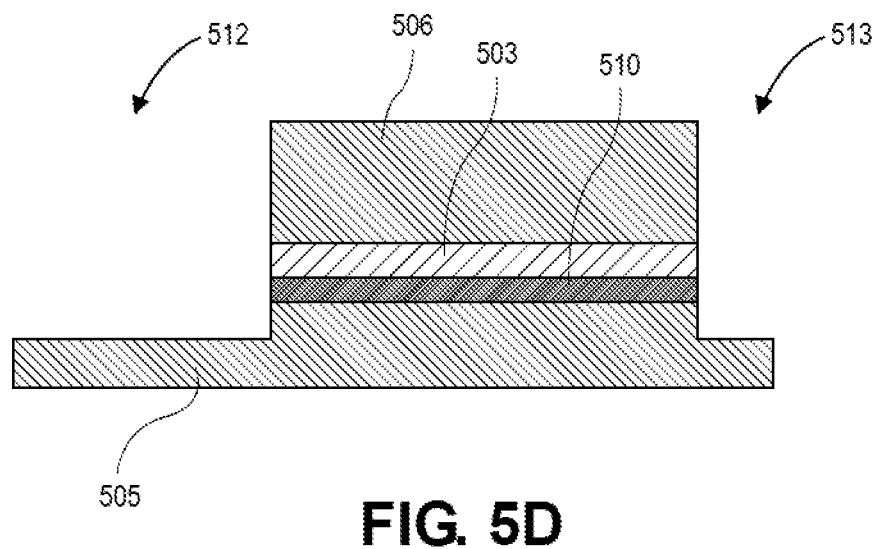

Referring now to FIG. 5D, a cross-sectional illustration of the glass layer 505 after the formation of a first recess 512 and a second recess 513 is shown, in accordance with an embodiment. The cross-section in FIG. 5D is along the line 5-5' in FIG. 5C. That is, the cross-section in FIG. 5D is along the length of one of the optical waveguides 510. As shown, the first recess 512 and the second recess 513 extend through the second glass layer 506. The first recess 512 and the second recess 513 may also extend into the glass layer 505. In the illustrated embodiment, the first recess 512 and the second recess 513 are substantially the same depth. In other embodiments, the first recess 512 and the second recess 513 may have different depths.

Figure 5E:
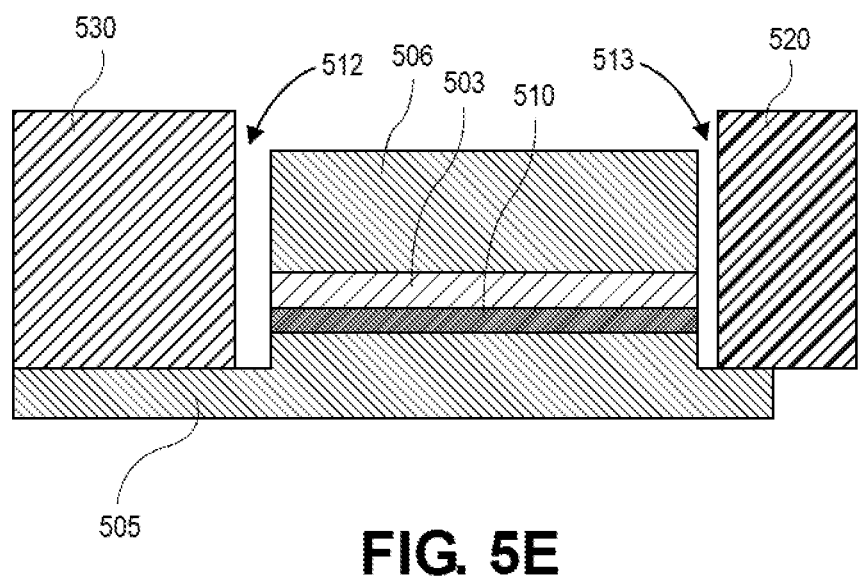

Referring now to FIG. 5E, a cross-sectional illustration of the device after a PIC 530 and an optics module 520 are inserted in the recesses 512 and 513 is shown, in accordance with an embodiment. In an embodiment, the PIC 530 is optically coupled to the optics module 520 by the optical waveguide 510.

Referring now to FIGS. 6A-6I, a series of illustrations depicting a process for forming an electronic package is shown, in accordance with an embodiment. In the embodiment shown in FIGS. 6A-6I, improved control of the z-height alignment of the optical waveguide is provided compared to embodiments where the recess depth sets the z-height of the optical waveguide relative to optical components. Instead, the bottom glass layer is used as an etchstop for the recesses and a first layer is used to set the height of the optical waveguides. This provides improved control since thickness control of material deposition is more precise than depth control of an etching process.

Figure 6A:
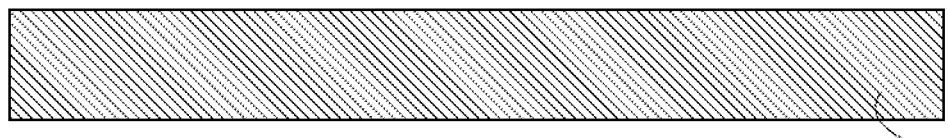
FIGS. 6A-6I are cross-sectional illustrations depicting a process for forming an electronic package with optical waveguides embedded between two low refractive index layers, in accordance with an embodiment.

Referring now to FIG. 6A, a cross-sectional illustration of a glass layer 605 is shown, in accordance with an embodiment. The glass layer 605 may be any suitable glass formulation. The glass layer 605 may have a thickness between approximately 100 μm and approximately 5,000 μm.

Figure 6B:
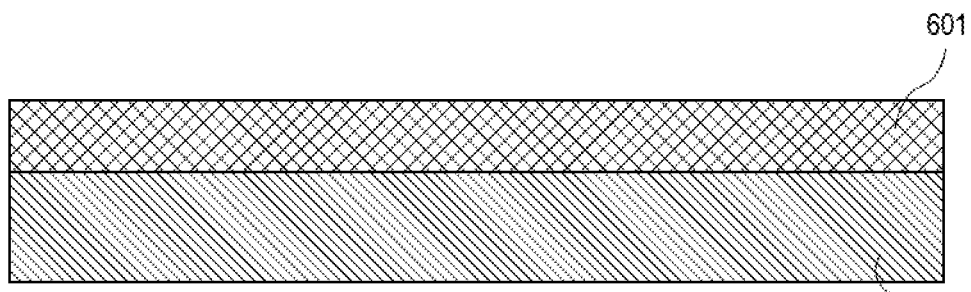

Referring now to FIG. 6B, a cross-sectional illustration of the glass layer 605 after a first layer 601 is disposed over the glass layer 605 is shown, in accordance with an embodiment. The first layer 601 may be a material with a low index of refraction. In a particular embodiment, the first layer 601 may comprise silicon and oxygen (e.g., $SiO_x$). The thickness of the first layer 601 may be precisely controlled in order to set the height of the optical waveguides above the glass layer 605.

Figure 6C:
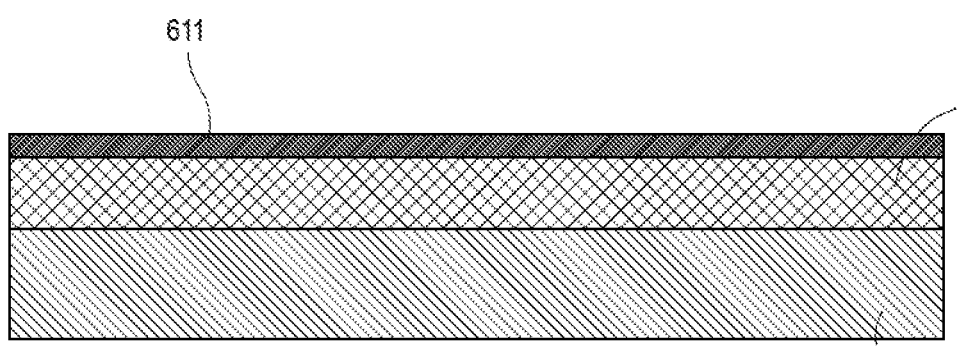

Referring now to FIG. 6C, a cross-sectional illustration of the glass layer 605 after a waveguide layer 611 is disposed over the first layer 601 is shown, in accordance with an embodiment. The waveguide layer 611 may be a material with an index of refraction that is greater than the index of refraction of the first layer 601. For example, the waveguide layer 611 may comprise silicon and nitrogen (e.g., $SiN_x$). The waveguide layer 611 may be deposited with any suitable deposition process, such as sputtering.

Figure 6D:
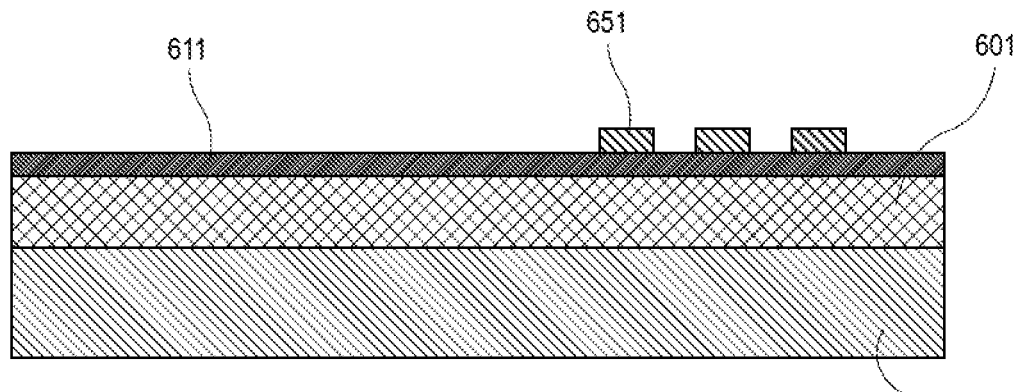

Referring no to FIG. 6D, a cross-sectional illustration of the glass layer 605 after a mask layer 651 is provided over the waveguide layer 611 is shown, in accordance with an embodiment. In an embodiment, the mask layer 651 may be a hardmask material or a soft mask material. The mask layer 651 may have the pattern desired for the optical waveguides.

Figure 6E:
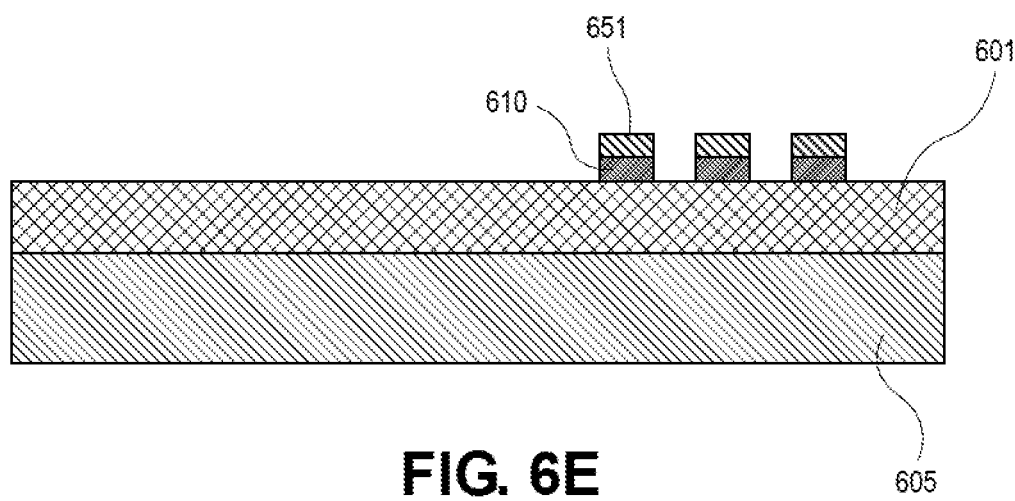

Referring now to FIG. 6E, a cross-sectional illustration of the glass layer 605 after the waveguide layer 611 is patterned to form optical waveguides 610 is shown, in accordance with an embodiment. In an embodiment, the optical waveguides 610 may be patterned with a plasma etching process or the like.

Figure 6F:
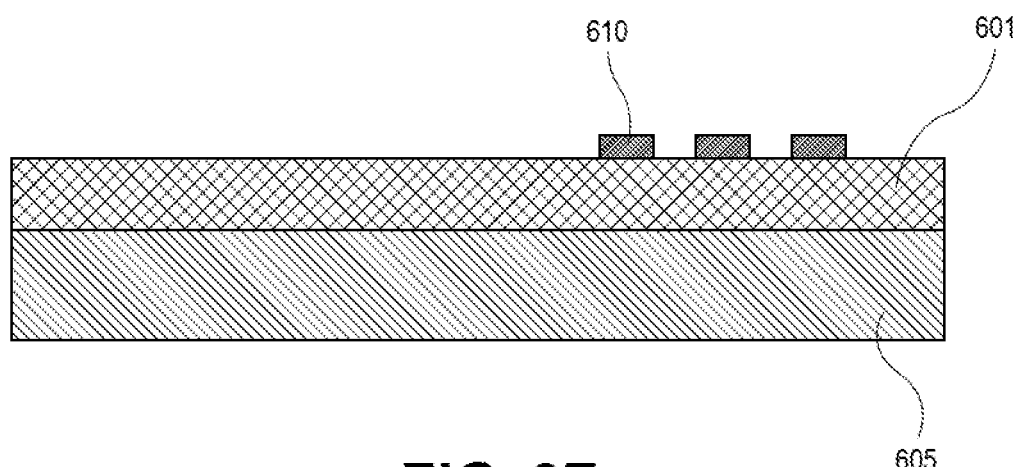

Referring now to FIG. 6F, a cross-sectional illustration of the glass layer 605 after the mask layer 651 is removed is shown, in accordance with an embodiment. The mask layer 651 may be removed with an ashing process or other suitable material removal process that is selective to the material of the mask layer 651.

Figure 6G:
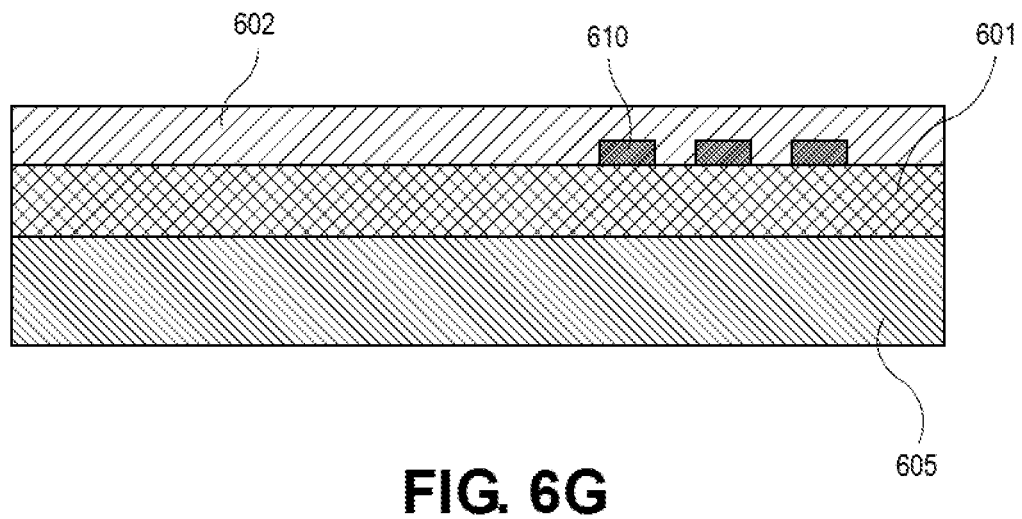

Referring now to FIG. 6G, a cross-sectional illustration of the glass layer 605 after a second layer 602 is provided over the first layer 601 and the optical waveguides 610 is shown, in accordance with an embodiment. In an embodiment, the second layer 602 comprises an index of refraction that is lower than the index of refraction of the optical waveguides 610. In some embodiments, the second layer 602 may be the same material as the first layer 601. Accordingly, the high index of refraction optical waveguides 610 are entirely surrounded by low index of refraction materials.

Figure 6H:
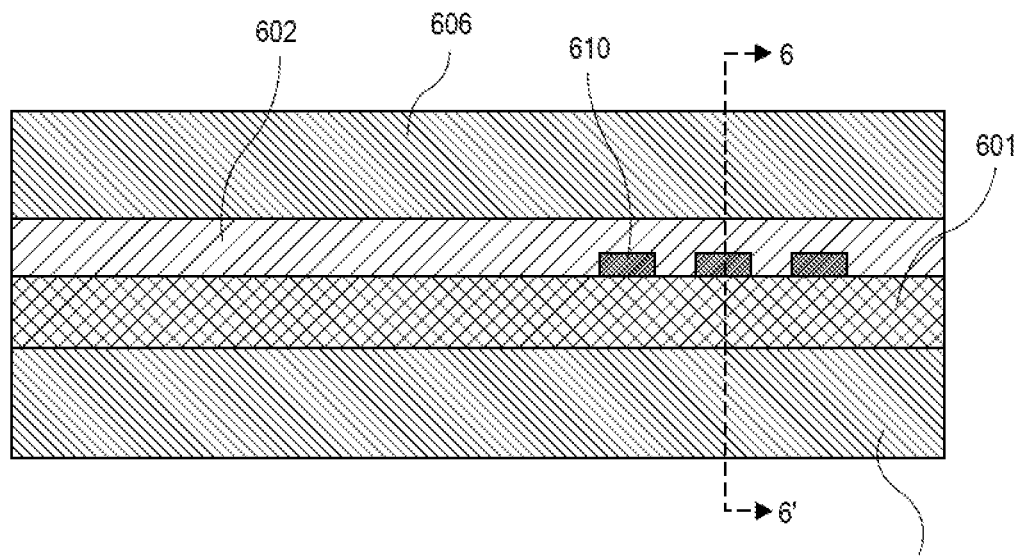

Referring now to FIG. 6H, a cross-sectional illustration of the glass layer 605 after a second glass layer 606 is provided over the second layer 602 is shown, in accordance with an embodiment. In an embodiment, the second glass layer 606 may be any glass formulation. In an embodiment, the second glass layer 606 may be substantially similar to the glass layer 605.

Figure 6I:
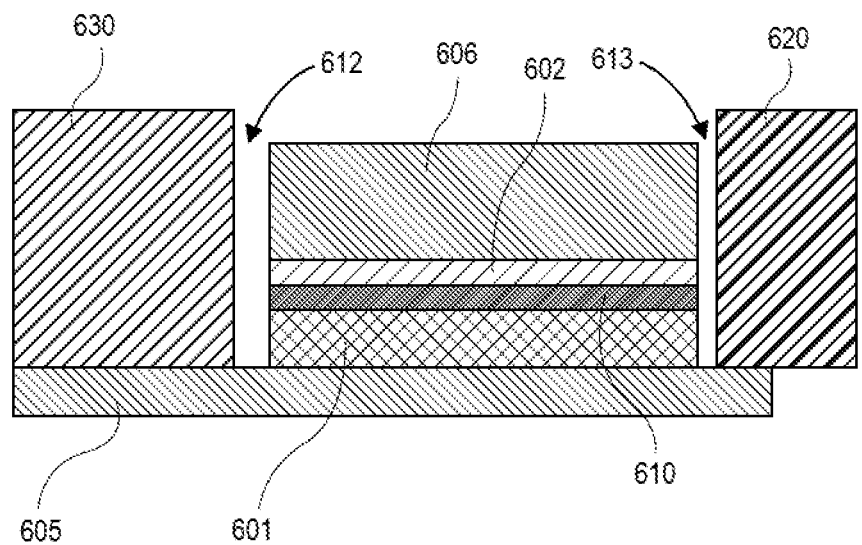

Referring now to FIG. 6I, a cross-sectional illustration of the structure after recesses 612 and 613 are formed is shown, in accordance with an embodiment. The cross-section in FIG. 6I is along the line 6-6' in FIG. 6H. That is, the cross-sectional illustration in FIG. 6I is along the length of a single one of the optical waveguides 610. As shown, the first recess 612 and the second recess 613 extend through the second glass layer 606, the second layer 602, and the first layer 601. The glass layer 605 serves as a bottom etchstop for the recesses 612 and 613. Accordingly, the PIC 630 and the optics module 620 have a flat bottom surface on which they can be mounted. Additionally, the height of the optical waveguides 610 relative to the PIC 630 and the optics module 620 is precisely controlled by the height of the first layer 601.

Figure 7:
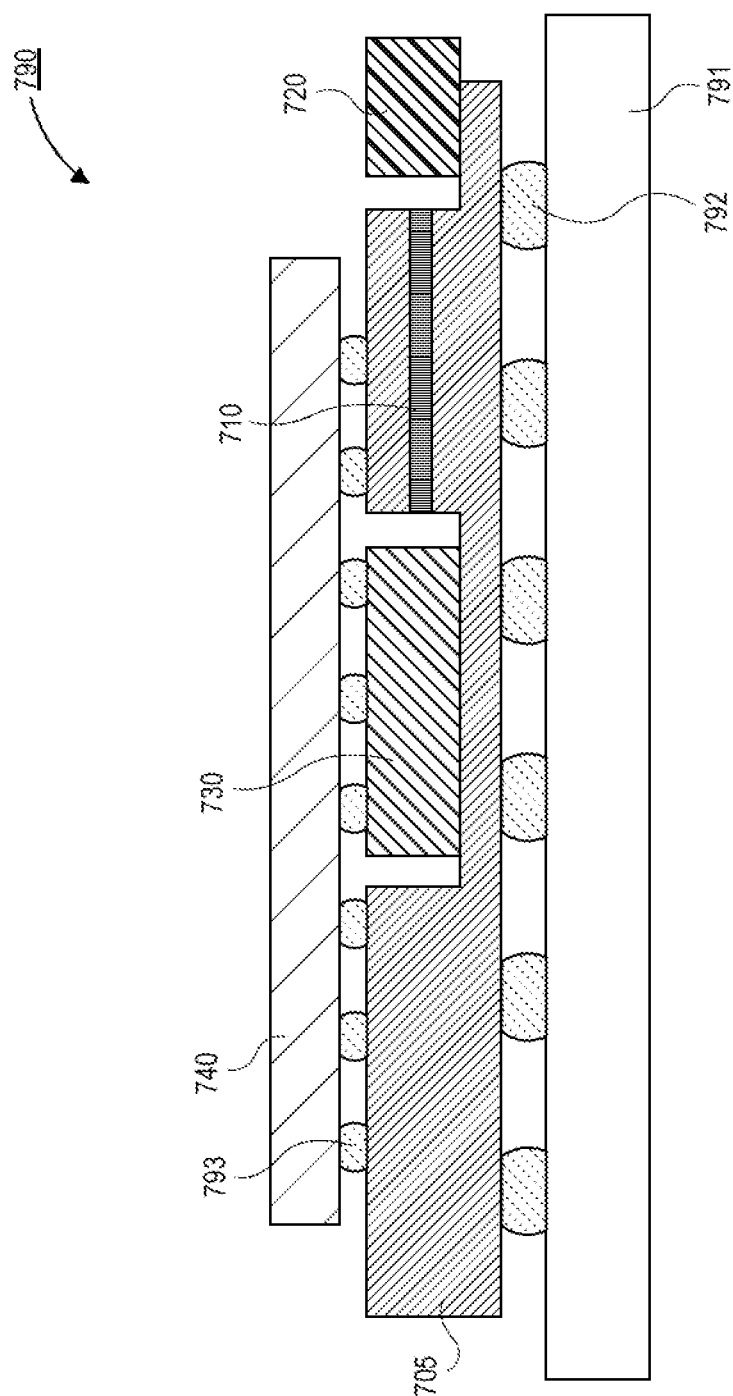
FIG. 7 is a cross-sectional illustration of the electronic system with a glass substrate with embedded optical waveguides, in accordance with an embodiment.

Referring now to FIG. 7, an electronic system 790 is shown, in accordance with an embodiment. In an embodiment, the electronic system 790 comprises a board 791, such as a printed circuit board (PCB). A glass substrate 705 may be coupled to the board 791 by interconnects 792. In an embodiment, a PIC 730 and an optics module 720 may be provided in recesses in the glass substrate 705. In an embodiment, the PIC 730 may be optically coupled to the optics module 720 by an embedded optical waveguide 710. A die 740 may be coupled to the glass substrate 705 and PIC 730 by interconnects 793. While the glass substrate 705 and optical waveguide 710 similar to the structure in FIG. 1A is shown in FIG. 7, it is to be appreciated that any of the optical waveguide architectures described herein may be used in the electronic system 790.

Figure 8:
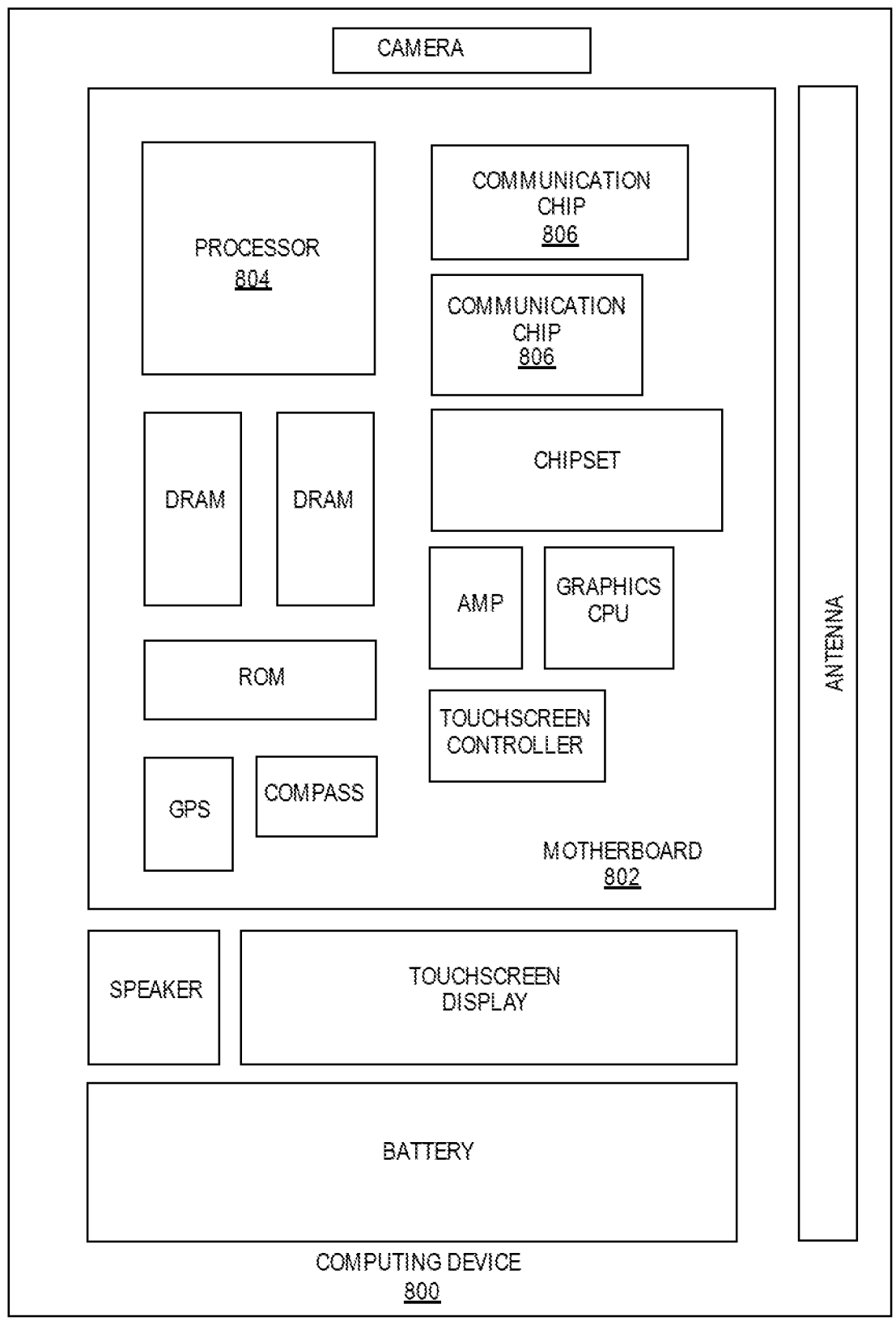
FIG. 8 is a schematic of a computing device built in accordance with an embodiment.

FIG. 8 illustrates a computing device 800 in accordance with one implementation of the invention. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. In some implementations of the invention, the integrated circuit die of the processor may be part of an electronic package that comprises a glass substrate with an embedded optical waveguide, in accordance with embodiments described herein. The term "processor" may refer to any device or portion of a device that processes electronic data from registers and/or memory to transform that electronic data into other electronic data that may be stored in registers and/or memory.

The communication chip 806 also includes an integrated circuit die packaged within the communication chip 806. In accordance with another implementation of the invention, the integrated circuit die of the communication chip may be part of an electronic package that comprises a glass substrate with an embedded optical waveguide, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: an electronic package, comprising: a first glass substrate; an adhesive over the first glass substrate; a second glass substrate over the adhesive; and an optical waveguide embedded in the adhesive.

Example 2: the electronic package of Example 1, further comprising: a first recess through the second glass substrate and the adhesive; a second recess through the second glass substrate and the adhesive; a photonics integrated circuit (PIC) in the first recess; and an optics module in the second recess, wherein the optical waveguide optically couples the PIC to the optics module.

Example 3: the electronic package of Example 2, wherein the first recess and the second recess extend into the first glass substrate.

Example 4: the electronic package of Example 2 or Example 3, wherein the optics module comprises a lens for coupling with an optical fiber.

Example 5: the electronic package of Examples 1-4, wherein the adhesive comprises: a first layer with a first refractive index, wherein the first layer is between the first glass substrate and the optical waveguide; and a second layer with the first refractive index, wherein the second layer is over and around the optical waveguide, and wherein the optical waveguide has a second refractive index that is higher than the first refractive index.

Example 6: the electronic package of Example 5, wherein the first layer and the second layer comprise silicon and oxygen, and wherein the optical waveguide comprises silicon and nitrogen.

Example 7: the electronic package of Example 5 or Example 6, wherein the first layer has a first thickness and the second layer has a second thickness, and wherein the first thickness is greater than the second thickness.

Example 8: the electronic package of Examples 1-7, wherein a surface of the optical waveguide is in contact with a surface of the first glass layer.

Example 9: the electronic package of Example 7, wherein the adhesive is over and around the optical waveguide.

Example 10: the electronic package of Examples 7-9, further comprising: a second optical waveguide over the adhesive, wherein the second optical waveguide is positioned directly above the optical waveguide.

Example 11: an electronic package, comprising: a glass substrate with a first recess and a second recess; a photonics integrated circuit (PIC) in the first recess; an optics module in the second recess; and an optical waveguide embedded in the glass substrate between the first recess and the second recess, wherein the optical waveguide optically couples the PIC to the optics module.

Example 12: the electronic package of Example 11, wherein the optical waveguide comprises the same material as the glass substrate, and wherein a microstructure of the optical waveguide is different than a microstructure of the glass substrate.

Example 13: the electronic package of Example 11 or Example 12, further comprising: a third recess in the glass substrate; a second PIC in the third recess; and a second optical waveguide embedded in the glass between the first recess and the third recess, wherein the second optical waveguide optically couples the PIC to the second PIC.

Example 14: the electronic package of Examples 11-13, wherein the optics module comprises a lens for coupling to an optical fiber.

Example 15: the electronic package of Examples 11-14, further comprising: a through glass via below the first recess, wherein the through glass via is electrically coupled to the PIC.

Example 16: the electronic package of Examples 11-14, further comprising: a through glass via adjacent to the first recess, wherein the through glass via extends between a first surface of the glass substrate and a second surface of the glass substrate.

Example 17: the electronic package of Examples 11-16, wherein the first recess has a first depth and the second recess has a second depth.

Example 18: the electronic package of Example 17, wherein the first depth is substantially equal to the second depth.

Example 19: a method of forming a package substrate, comprising: depositing a first layer over a first glass substrate; patterning the first layer to form a plurality of optical waveguides; disposing an adhesive over the first glass substrate and the optical waveguides; and attaching a second glass substrate to the adhesive.

Example 20: the method of Example 19, wherein the optical waveguides have a first index of refraction, and wherein the adhesive has a second index of refraction that is lower than the first index of refraction.

Example 21: the method of Example 19 or Example 20, further comprising: forming a first recess into the second glass substrate and the adhesive; and forming a second recess into the second glass substrate and the adhesive.

Example 22: the method of Example 21, wherein a photonics integrated circuit (PIC) is placed into the first recess and an optics module is placed into the second recess, and wherein the optical waveguides optically couple the PIC to the optics module.

Example 23: an electronic system, comprising: a board; a package substrate coupled to the board, wherein the package substrate comprises: a first glass substrate; an adhesive over the first glass substrate; a second glass substrate over the adhesive; an optical waveguide embedded in the adhesive; a first recess through the second glass substrate and the adhesive; a second recess through the second glass substrate and the adhesive; a photonics integrated circuit (PIC) in the first recess; and an optics module in the second recess, wherein the optical waveguide optically couples the PIC to the optics module; and a die coupled to the package substrate.

Example 24: the electronic package of Example 23, wherein the first recess and the second recess extend into the first glass substrate.

Example 25: the electronic package of Example 23 or Example 24, wherein the adhesive comprises: a first layer with a first refractive index, wherein the first layer is between the first glass substrate and the optical waveguide; and a second layer with the first refractive index, wherein the second layer is over and around the optical waveguide, and wherein the optical waveguide has a second refractive index that is higher than the first refractive index.

What is claimed is:

1. An electronic package, comprising:
    a first glass substrate;
    an adhesive over the first glass substrate;
    a second glass substrate over the adhesive, wherein the first glass substrate extends laterally beyond sides of the second glass substrate;
    an optical waveguide embedded in the adhesive;
    a first recess through the second glass substrate and the adhesive;
    a second recess through the second glass substrate and the adhesive;
    a photonics integrated circuit (PIC) in the first recess; and
    an optics module in the second recess, wherein the optical waveguide optically couples the PIC to the optics module.

2. The electronic package of claim 1, wherein the first recess and the second recess extend into the first glass substrate.

3. The electronic package of claim 1, wherein the optics module comprises a lens for coupling with an optical fiber.

4. The electronic package of claim 1, wherein the adhesive comprises:
    a first layer with a first refractive index, wherein the first layer is between the first glass substrate and the optical waveguide; and
    a second layer with the first refractive index, wherein the second layer is over and around the optical waveguide, and wherein the optical waveguide has a second refractive index that is higher than the first refractive index.

5. The electronic package of claim 4, wherein the first layer and the second layer comprise silicon and oxygen, and wherein the optical waveguide comprises silicon and nitrogen.

6. The electronic package of claim 4, wherein the first layer has a first thickness and the second layer has a second thickness, and wherein the first thickness is greater than the second thickness.

7. The electronic package of claim 1, wherein a surface of the optical waveguide is in contact with a surface of the first glass substrate.

8. The electronic package of claim 1, wherein the adhesive is over and around the optical waveguide.

9. The electronic package of claim 6, further comprising:
a second optical waveguide over the adhesive, wherein the second optical waveguide is positioned directly above the optical waveguide.

10. A method of forming a package substrate, comprising:
depositing a first layer over a first glass substrate;
patterning the first layer to form a plurality of optical waveguides;
disposing an adhesive over the first glass substrate and the optical waveguides;
attaching a second glass substrate to the adhesive, wherein the first glass substrate extends laterally beyond sides of the second glass substrate;
forming a first recess into the second glass substrate and the adhesive; and
forming a second recess into the second glass substrate and the adhesive.

11. The method of claim 10, wherein the optical waveguides have a first index of refraction, and wherein the adhesive has a second index of refraction that is lower than the first index of refraction.

12. The method of claim 10, wherein a photonics integrated circuit (PIC) is placed into the first recess and an optics module is placed into the second recess, and wherein the optical waveguides optically couple the PIC to the optics module.

13. An electronic system, comprising:
a board;
a package substrate coupled to the board, wherein the package substrate comprises:
a first glass substrate;
an adhesive over the first glass substrate;
a second glass substrate over the adhesive;
an optical waveguide embedded in the adhesive;
a first recess through the second glass substrate and the adhesive;
a second recess through the second glass substrate and the adhesive;
a photonics integrated circuit (PIC) in the first recess; and
an optics module in the second recess, wherein the optical waveguide optically couples the PIC to the optics module; and
a die coupled to the package substrate.

14. The electronic package of claim 13, wherein the first recess and the second recess extend into the first glass substrate.

15. The electronic package of claim 13, wherein the adhesive comprises:
a first layer with a first refractive index, wherein the first layer is between the first glass substrate and the optical waveguide; and
a second layer with the first refractive index, wherein the second layer is over and around the optical waveguide, and wherein the optical waveguide has a second refractive index that is higher than the first refractive index.

16. An electronic package, comprising:
a first glass substrate;
an adhesive over the first glass substrate;
a second glass substrate over the adhesive, wherein the first glass substrate extends laterally beyond sides of the second glass substrate; and
an optical waveguide embedded in the adhesive, wherein the adhesive comprises:
a first layer with a first refractive index, wherein the first layer is between the first glass substrate and the optical waveguide; and
a second layer with the first refractive index, wherein the second layer is over and around the optical waveguide, and wherein the optical waveguide has a second refractive index that is higher than the first refractive index.

17. The electronic package of claim 16, wherein the first layer and the second layer comprise silicon and oxygen, and wherein the optical waveguide comprises silicon and nitrogen.

18. The electronic package of claim 16, wherein the first layer has a first thickness and the second layer has a second thickness, and wherein the first thickness is greater than the second thickness.

19. The electronic package of claim 18, further comprising:
a second optical waveguide over the adhesive, wherein the second optical waveguide is positioned directly above the optical waveguide.

20. An electronic package, comprising:
a first glass substrate;
an adhesive over the first glass substrate;
a second glass substrate over the adhesive, wherein the first glass substrate extends laterally beyond sides of the second glass substrate; and
an optical waveguide embedded in the adhesive, wherein a surface of the optical waveguide is in contact with a surface of the first glass substrate.

21. An electronic package, comprising:
a first glass substrate;
an adhesive over the first glass substrate;
a second glass substrate over the adhesive, wherein the first glass substrate extends laterally beyond sides of the second glass substrate; and
an optical waveguide embedded in the adhesive, wherein the adhesive is over and around the optical waveguide.

* * * * *